United States Patent Office 3,682,788
Patented Aug. 8, 1972

3,682,788
COPPER ELECTROPLATING
Otto Kardos, Ferndale, Donald Allan Arcilesi, Sterling
Heights, Arthur James Tomson, Farmington, and
Sylvester Paul Valayil, Detroit, Mich., assignors to
M & T Chemicals Inc., New York, N.Y.
No Drawing. Filed July 28, 1970, Ser. No. 59,034
Int. Cl. C23b 5/20, 5/46
U.S. Cl. 204—52 R                     14 Claims

ABSTRACT OF THE DISCLOSURE

In accordance with certain of its aspects, this invention relates to novel compositions and to a process for electrodepositing bright, strongly leveled, ductile copper from an aqueous acidic copper plating bath containing chloride ions and at least one member independently selected from each of the following groups:

(A) a polysulfide compound of the formula

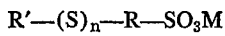

(B) An open-thiourea compound of the formula

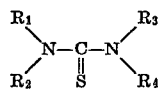

and/or tautomers thereof; and (C) a polyether containing at least 5 ether oxygen atoms per molecule;

wherein each R is independently a divalent aliphatic or aromatic non-heterocyclic group of 1–10 carbon atoms; R' is hydrogen, a metal cation, a monovalent aliphatic or aromatic group of 1–20 carbon atoms, or the groups —R—$SO_3$M or —R—$(S)_q$—$RSO_3$M wherein $q$ is an integer 2–5; M is a cation; each of $R_1$, $R_2$, $R_3$, and $R_4$ is independently hydrogen or an alkyl, aryl, alkenyl, acetyl, aldehydoalkyl, amino, hetero group having a ring containing 5–7 ring atoms and at least one hetero-atom selected from the group consisting of oxygen, nitrogen, and sulfur; hydroxyalkyl or aminoalkyl group of 1–16 carbon atoms; with at least one $R_{1-4}$ a hydrogen atoms; each of $R_{1-2}$ and $R_{3-4}$ may form a ring with each of the nitrogen atoms; and $n$ is an integer 2–5.

Novel Processes and Compositions

This invention relates to novel processes and compositions for the electrodeposition of copper from aqueous acidic baths. More particularly, this invention relates to certain bath compositions containing specified combinations of chemical ingredients and to the use of such compositions to obtain bright, ductile, strongly leveled copper electrodeposits.

It is an object of this invention to obtain bright, ductile, leveled copper electrodeposits. A further object of the invention is to provide novel plating bath compositions from which bright copper electrodeposits may be obtained wherein said electrodeposits exhibit good leveling and ductility over wide current density ranges. Other objects of the invention will be apparent from the following detailed description.

In accordance with certain of its aspects, this invention relates to novel compositions and to a process for electrodepositing bright, strongly leveled, ductile copper from an aqeosu acidic copper plating bath containing chloride ions and at least one member from each of the following groups:

(A) a polysulfide compound of the formula

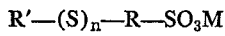

(B) an open-thiourea compound of the formula

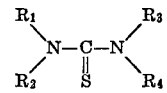

and/or tautomers thereof; and (C) a polyether, containing at least 5 ether oxygen atoms per molecule;

wherein each R is independently a divalent aliphatic or aromatic non-heterocyclic group of 1–10 carbon atoms; R' is hydrogen, a metal cation, a monovalent aliphatic or aromatic group of 1–20 carbon atoms, or the groups —R—$SO_3$M— or —R—$(S)_q RSO_3$M wherein $q$ is an integer 2–5; M is a cation; each of $R_1$, $R_2$, $R_3$, and $R_4$ is independently hydrogen or an alkyl, aryl, alkenyl, acetyl, aldehydoalkyl, amino, hetero groups having a ring containing 5–7 ring atoms and at least one hetero-atom selected from the group consisting of oxygen, nitrogen, and sulfur; hydroxyalkyl or aminoalkyl group of 1–16 carbon atoms; with at least one $R_{1-4}$ a hydrogen atom; each of $R_{1-2}$ and $R_{3-4}$ may form a ring with each of the nitrogen atoms; and $n$ is an integer 2–5.

When several radicals R are present, the R groups may or may not be identical.

The combination of these three additives in a chloride-containing copper plating bath gives unexpected beneficial effects over the use of each additive alone in a chloride-containing copper plating bath.

Simultaneous use of at least one member from each of the three groups of additives gives bright copper deposits over a wide current density range with strong leveling properties. As used herein, the term "leveled" denotes a surface which is smoother than its substrate. The high degree and rate of leveling leads to an important economy in finishing costs and materials. The improved low current density brightness (i.e. the widening of the bright current density range) is important if strongly profiled objects are to be plated. The polysulfide sulfonates, as defined herein, have been found to be much more effective when employed according to the invention than the corresponding monosulfides.

When used alone these classes of additives (denoted A, B, and C herein) may be found to be deficient in one or more aspects. Thus, the copper deposits obtained may not be bright, smooth, and may not exhibit adequate leveling properties over a sufficient current density range. Combinations utilizing two of the additives may give fairly bright copper deposits, but the current density range of brightness may be limited and/or the rate of leveling (decrease of surface roughness) may be low. Other double combinations of additives may give striated deposits and limited bright current density ranges.

The novel compositions of the invention may be employed in combination with aqueous acidic copper plating baths. Typical aqueous acidic copper plating baths which may be employed in combination with the novel additive compositions (A, B, and C) of the invention include the following:

TABLE I (1) Sulfate bath:
   $CuSO_4 \cdot 5H_2O$—150–300 g./l. (preferably about 220 g./l.
   $H_2SO_4$—10–110 g./l. (preferably about 60 g./l.)
   $Cl^-$—5–150 mg./l. (preferably about 20–80 mg./l.

(2) Fluoborate bath:
   $Cu(BF_4)_2$—100–600 g./l. (preferably about 224 g./l.)
   $HBF_4$—1–60 g./l. (preferably about 3.5 g./l.)
   $H_3BO_3$—0–30 g./l. (preferably about 15 g./l.)
   $Cl^-$—5–150 mg./l. (preferably about 20–80 mg./l.)

The basis metals which may be electroplated in accordance with the process of this invention may include ferrous metals, such as steel, iron, etc. bearing a surface layer of nickel or cyanide copper; zinc and its alloys including zinc-base die-cast articles bearing a surface layer of cyanide copper or pyrophosphate copper; nickel, including nickel alloys with other metals such as cobalt-iron; aluminum, including its alloys, after suitable pretreatment, etc.

After the deposition of the bright leveled copper deposit of this invention, generally a bright nickel deposit and a chromium deposit (which may be microporous or microcracked) may be applied. The bright acid copper deposit of this invention contributes to the appearance and performance of the composite coating because of its very high rate of leveling, its excellent pore-filling capacity, its high luster, good ductility and low internal stress. It improves corrosion resistance and permits economy in nickel use.

Because of its strong leveling properties, its very good performance at high current densities, and its very good mechanical properties (especially good ductility and low stress) the bright acid copper electrodeposits of this invention may be used for industrial applications such as electroforming, the plating of memory drums, printing rolls, etc. The process gives very good results also for the plating of non-conducting materials, such as plastics, after the usual pretreatment.

The plating conditions for electrodeposition from the aforementioned baths may, for example, include temperatures of 10° C.–60° C. (preferably 20° C.–40° C.); pH (electrometric) of less than about 2.5; and a cathode current density of .1–50.0 amperes per square decimeter (asd.).

Typical average current densities may be 2–20 asd. for the sulfate bath and about 4–40 asd. for the fluoborate bath. Air agitation, volume agitation, or mechanical agitation may increase the effective current density ranges and enhance the uniformity of the copper deposit.

In accordance with certain of its aspects, this invention relates to novel compositions and to a process for electrodepositing bright, strongly leveled, ductile copper from an aqueous acidic copper plating bath containing chloride ions and at least one member independently selected from each of the following groups:

(A) a polysulfide compound of the formula $$R'—(S)_n—R—SO_3M$$

(B) an open-thiourea compound of the formula

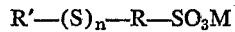

and/or tautomers thereof; and (C) a polyether, containing at least 5 ether oxygen atoms per molecule;

wherein each R is independently a divalent aliphatic or aromatic non-heterocyclic group of 1–10 carbon atoms; R' is hydrogen, a metal cation, a monovalent aliphatic or aromatic group of 1–20 carbon atoms, or the groups —R—SO₃M or —R—(S)_q —RSO₃M wherein $q$ is an integer 2–5; M is a cation; each of $R_1$, $R_2$, $R_3$, and $R_4$ is independently hydrogen or an alkyl, aryl, alkenyl, acetyl, aldehydoalkyl, amino, hetero group having a ring containing 5–7 ring atoms and at least one hetero-atom selected from the group consisting of oxygen, nitrogen, and sulfur; hydroxyalkyl or aminoalkyl group of 1–16 carbon atoms, with at least one $R_{1-4}$ a hydrogen atom; each of $R_{1-2}$ and $R_{3-4}$ may form a ring with each of the nitrogen atoms; and $n$ is an integer 2–5.

Sulfide compounds wherein $n$ is an integer 2–4 are preferred. R may be a divalent hydrocarbon group (including such hydrocarbon groups containing inert substituents such as hydroxyl, alkoxy, polyoxyalkylene, halogen, etc.) of 1–10 carbon atoms such as an alkylene group of 1–10 carbon atoms (i.e. —CH₂—, —CH₂CH₂—, —(CH₂)₃—, —(CH₂)₅—, and, in general, —(CH₂)_p— wherein $p$ is an integer 1–10). R may be a divalent non-heterocyclic group of 1–10 carbon atoms containing 1–3 oxygen, 1–3 sulfur, or 1–3 nitrogen atoms (such as

—CH₂CH₂OCH₂CH₂—, —CH₂OCH₂CH₂O—CH₂, —CH₂CH₂—

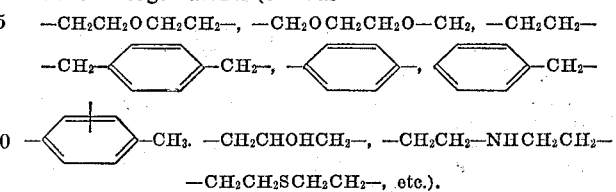

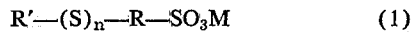—CH₃. —CH₂CHOHCH₂—, —CH₂CH₂—NHCH₂CH₂—

—CH₂CH₂SCH₂CH₂—, etc.).

In the compound $$R'—(S)_n—R—SO_3M \quad (1)$$

R' may be a hydrocarbon radical preferably selected from the group consisting of alkyl, alkenyl, alkynyl, cycloalkyl, aralkyl, aryl, alkaryl, including such radicals when inertly substituted. When R' is alkyl, it may typically be straight chain alkyl or branched alkyl, including methyl, ethyl, n-propyl, isopropyl, n-butyl, isobutyl, sec-butyl, tert-butyl, n-amyl, neopentyl, isoamyl, n-hexyl, isohexyl, heptyls, octyls, decyls, dodecyls, etc. Preferred alkyl includes lower alkyl, i.e. having less than about 8 carbon atoms, i.e. octyls and lower. When R' is alkenyl, it may typically be vinyl, allyl, methallyl, buten-1-yl, buten-2-yl, butyn-3-yl, penten-1-yl, hexenyl, heptenyl, octenyl, decenyl, dodecenyl, tetra-decenyl, octadecenyl, etc. When R' is alkynyl, it may typically be ethynyl, propargyl, butynyl, etc. When R' is cycloalkyl, it may typically be cyclopentyl, cyclohexyl, cycloheptyl, cyclooctyl, etc. When R' is aralkyl, it may typically be tolyl, xylyl, p-ethylphenyl, p-nonylphenyl, etc. R' may be inertly substituted, e.g. may bear a non-reactive substituent such as alkyl, aryl, cycloalkyl, aralkyl, alkaryl, alkenyl, ether, etc.

Polysulfide compounds of the Formula A may typically be prepared by the reaction of an alkali metal salt of a hydropolysulfide and a sultone according to the reaction:

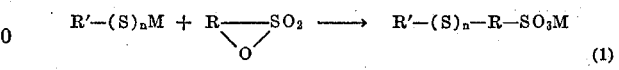

(1)

wherein R, R', M, and $n$ are as previously defined.

Specific illustrative reactions may include the following reactions wherein all unsubstituted carbon atoms are attached to hydrogen atoms:

(1)

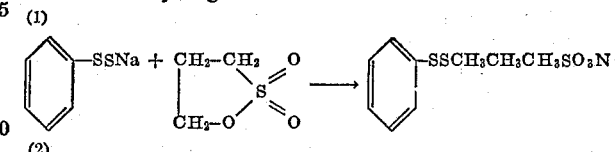

(2)

CH₃(CH₂)₇SSK + (CH₂)₂—CH₃

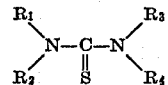 → CH₃(CH₂)₇SS(CH₂)₄SO₃K (3)

NaS₂ + 2CH₂—CH₂

→ NaO₃S(CH₂)₃—SS(CH₂)₃SO₃Na (4)

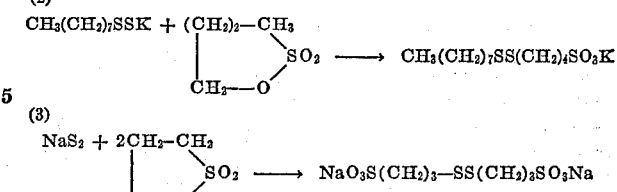

(5)

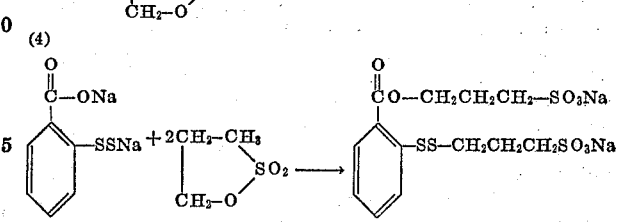

Other preparative reactions which may be used to produce the sulfide compounds employed according to the invention include the direct sulfonation of an organo polysulfide (i.e. direct sulfonation of diphenyl disulfide, ditolyl disulfide, etc.). The polysulfide compounds also may be prepared by the reaction of epichlorohydrin and an alkali metal bisulfite followed by reaction with a polysulfide (such as $Na_2S_2$, $R'S_2Na$, wherein $R'$ is as previously defined).

Other preparative reactions may include the following:

(a) $SCl_2 + 2NaS(CH_2)_3SO_3Na \rightarrow$
$NaO_3S(CH_2)_3S-S-(CH_2)_3SO_3Na$ (b) $S_2Cl_2 + 2NaS(CH_2)_3SO_3Na \rightarrow$
$NaO_3S(CH_2)_3S-S-S-S-(CH_2)_3SO_3Na$ (c) $ClCH_2CH_2Cl + 2NaSS(CH_2)_3SO_3Na \rightarrow$
$NaO_3S(CH_2)_3SSCH_2CH_2SS(CH_2)_3Na$ (d) $ClCH_2CH_2Cl + NaSS(CH_2)_3SO_3Na$
$+ NaS(CH_2)_3SO_3Na \rightarrow$
$NaO_3S(CH_2)_3SSCH_2CH_2S(CH_2)_3SO_3Na$ Typical polysulfide compounds which may be employed according to the invention include the following compounds which are summarized in Table II. In the formula $$R'-(S)_nR-SO_3M \qquad (1)$$

M represents a sodium cation and R, R' and n are as indicated in Table II.

TABLE II

[Sulfonated polysulfide cooperating brighteners of the formula $R'-(S)-RSO_3Na$]

| Additive | R' | n | R |
|---|---|---|---|
| A-1 | phenyl | 2 | $(CH_2)_3$ |
| A-2 | methylphenyl | 2 | $(CH_2)_3$ |
| A-3 | $H_3C$-phenyl | 2 | $(CH_2)_3$ |
| A-4 | $H_3C$-phenyl-phenyl | 2 | $(CH_2)_3$ |
| A-5 | phenyl-$C(=O)-O(CH_2)_3SO_3Na$ | 2 | $(CH_2)_3$ |
| A-6 | phenyl-$NH(CH_2)_3SO_3H$ | 2 | $(CH_2)_3$ |
| A-7 | $H_3C$-phenyl-$SO_3Na$ | 2 | phenyl-$CH_3$ |
| A-8 | $NaO_3S(CH_2)_2$ | 2 | $(CH_2)_2$ |
| A-9 | $NaO_3S(CH_2)_3$ | 2 | $(CH_2)_3$ |
| A-10 | $NaO_3S(CH_2)_4$ | 2 | $(CH_2)_4$ |
| A-11 | $NaO_3S(CH_2)_3$ | 4 | $(CH_2)_3$ |
| A-12 | Na (or H) | 2 | $(CH_2)_3$ |
| A-13 | $NaO_3S(CH_2)_3S_2(CH_2)_3$ | 2 | $(CH_2)_3$ |
| A-14 | $NaO_3S(CH_2)_3S_2CH_2CH=CHCH_2$ | 2 | $(CH_2)_3$ |
| A-15 | $NaO_3S(CH_2)_3S_2CH_2C\equiv CCH_2$ | 2 | $(CH_2)_3$ |
| A-16 | $NaO_3S(CH_2)_3S_2(CH_2)_3$ | 2 | $(CH_2)_3$ |
| A-17 | $CH_3CH_2CH_2CH_2$ | 2 | $(CH_2)_3$ |
| A-18 | $H_2C=CHCH_2$ | 2 | $(CH_2)_3$ |
| A-19 | $HC\equiv CCH_2$ | 2 | $(CH_2)_3$ |
| A-20 | naphthyl | 2 | $(CH_2)_3$ |
| A-21 | $HO_3S$-naphthyl | 2 | $(CH_2)_3$ |
| A-22 | $NaO_3SCH_2CH(OH)CH_2$ | 2 | $CH_2CH(OH)CH_2$ |

The $R'(S)_nNa$ compound may be prepared by the reaction of $R'SNa$ with sulfur if $R'$ is an aromatic group (compounds A-1, A-2, A-3, A-4, A-5, A-20). A typical procedure is: To a methanol solution (150 ml.) containing sodium methoxide (0.1 m.) is added the $R'SH$ (0.1 m.) compound. The mixture is stirred at room temperature until the compound has dissolved. Sulfur powder (0.1 gram-equivalent) is added and the mixture stirred until all the sulfur is dissolved. Propanesultone (0.12 mole) is added to the stirred solution. Stirring is continued for 30 minutes, during which time a solid precipitates from the solution. Acetone (250 ml.) is then added to give additional solid, which is then filtered, washed with acetone, and dried.

Aliphatic $R'(S)_nNa$ compounds are prepared by reaction of $R'Q$ with $Na_2S_n$, where Q is Cl, Br, I, $-OSO_2C_6H_5$, $-OSO_2C_6H_4 \cdot CH_3$, $-OSO_2CH_3$ (e.g. compounds A-17, A-18, A-19). A typical procedure is: To a stirred methanol solution (150 ml.) containing sodium disulfide (0.1 m.) is added dropwise a solution of $R'Q$ (0.1 m.) in methanol (50 ml.) at room temperature. The reaction is slightly exothermic. After the addition is completed the mixture is stirred for 30 minutes. Propane slutone (0.12 m.), which may be dissolved in methanol (50 ml.), is added to the stirred mixture. During the addition of propane sultone a white solid usually precipitates from the solution. The mixture may be heated and stirred at 65° C. for 30 minutes and then cooled. Acetone is added and the solid is filtered and dried.

Compounds of the type of A-9, A-10, A-11, A-12 are prepared by the reaction of an alkali metal polysulfide ($Na_2S_2$, $Na_2S_4$, etc.) with a sultone.

Compounds of the type of A-13, A-14, A-15, A-16 are prepared according to the reaction sequence:

(1) $QRQ + 2Na_2S_2 \longrightarrow NaS_2RS_2Na + 2NaQ$ (2)

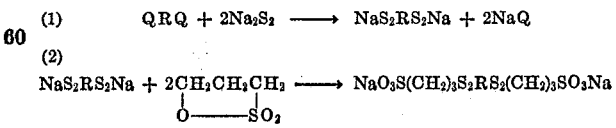

Instead of sultones, haloalkane sulfonates, including e.g. $ClCH_2CHOHCH_2SO_3Na$ (prepared by reaction of epichlorohydrin with sodium bisulfite), and in general compounds of the type $QRSO_3M$, may be used.

Some polysulfide compounds may also be prepared by the direct sulfonation of an oragnic polysulfide (e.g. A-7; or A-21 by sulfonation of A-20).

Symmetrical disulfides may be prepared by careful oxidation of compounds of the type $HSRSO_3Na$.

It is sometimes advantageous to prepare aqueous stock solutions of the sulfonated polysulfides containing small amounts of copper sulfate and/or sulfuric acid. Some precipitation may occur which is eliminated by filtration.

The sulfide compounds of the invention may be present in the copper bath in effective amount of about 0.001 g./l.–1.0 g./l., preferably 0.005 g./l.–0.2 g./l.

The open thiourea cooperating additives of the invention may include non-heterocyclic compounds of the formula:

(B) 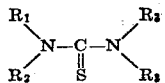

and/or tautomers thereof; and wherein each of $R_1$, $R_2$, $R_3$, and $R_4$ is independently hydrogen or an alkyl, aryl, alkenyl, acetyl, aldehydoalkyl, amino, hetero group having a ring containing 5–7 ring atoms and at least one hetero-atom selected from the group consisting of oxygen, nitrogen, and sulfur; hydroxyalkyl or aminoalkyl group of 1–16 carbon atoms; with at least one $R_{1-4}$ a hydrogen atom; each of $R_{1-2}$ and $R_{3-4}$ may form a ring with each of the nitrogen atoms; and $n$ is an integer 2–5.

Each of $R_1$, $R_2$, $R_3$, and $R_4$ in Formula B may independently be a straight chain alkyl or a branched chain alkyl of 1–16 carbon atoms, including methyl, ethyl, n-propyl, isopropyl, n-butyl, isobutyl, sec.-butyl, tert.-butyl, neopentyl, isoamyl, n-hexyl, isohexyl, heptyls, octyls, nonyls, decyls, dodecyls, tetradecyls, pentadecyls, and hexadecyls, etc. Preferred alkyl groups include alkyl groups having from 1–6 carbon atoms. When one or more of $R_1$, $R_2$, $R_3$, and $R_4$ is an alkenyl group, each may typically be vinyl, allyl, methallyl, buten-1-yl, buten-2-yl, buten-3-yl, penten-1-yl, hexenyl, heptenyl, octenyl, decenyl, dodecenyl, tetradecenyl, pentadecenyl, hexadecenyl, etc. When one or more of $R_1$, $R_2$, $R_3$, and $R_4$ is a cycloalkyl group, each may independently be cyclobutyl, cyclopentyl, cyclohexyl, cycloheptyl, cyclooctyl, etc. When one or more of $R_{1-4}$ is an aryl group each may be aralkyl group or an alkaryl group. When one or more of $R_{1-4}$ is an aralkyl group, each may independently be benzyl, β-phenethyl, α-phenylpropyl, β-phenylpropyl, etc. Each of $R_{1-4}$ may be phenyl, naphthyl, p-ethylphenyl, tolyls, xylyl, p-nonylphenyl, etc. Each $R_{1-4}$ group may be inertly substituted e.g. may bear a non-reactive (bath compatible) substituent such as alkyl, aryl, cycloalkyl, aralkyl, alkaryl, alkenyl, alkoxy, etc. of from 1–6 carbon atoms. Each of $R_{1-4}$ may be an amino group ($—NH_2$); a hydroxyalkylamino group (such as

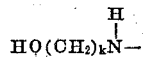

wherein $k$ is an integer of 1–6); or an aminoalkyl group (such as $H_2N—R_0—$, wherein $—R_0—$ is a divalent alkylene group of 1–6 carbon atoms), aldehydoamino

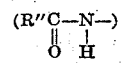

wherein $R''$ is hydrogen or an organic group of 1–10 carbon atoms, and arylamino (such as phenylamino).

Good results have been obtained when $R_{1-2}$ or $R_{3-4}$ of Formula B form morpholino groups

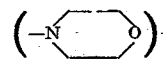

piperidinyl, or piperazinyl groups, it being understood that each carbon having unsatisfied valences in all of the formulae used in this specification are bonded to a sufficient number of hydrogen atoms to satisfy said valences.

The open-thiourea compounds of Formula B may be employed in effective amounts, typically 0.1–20 mg./l. and preferably 0.2–10 mg./l. of total aqueous bath composition. Typical open-thiourea compounds of the Formula B which may be employed according to the invention may include compounds wherein the groups $R_1$, $R_2$, $R_3$, and $R_4$ are as defined in Table III.

TABLE III.—OPEN THIOUREAS

| B | $R_1$ | $R_2$ | $R_3$ | $R_4$ | Name |
|---|---|---|---|---|---|
| 1 | H | H | H | H | Thiourea. |
| 2 | CH₃ | H | H | H | 1-methylthiourea. |
| 3 | CH₃ | H | H | CH₃ | 1,3-dimethylthiourea. |
| 4 | C₂H₅ | H | H | H | 1-ethylthiourea. |
| 5 | C₂H₅ | H | H | C₂H₅ | 1,3-diethylthiourea. |
| 6 | iso-C₃H₇ | H | H | iso-C₃H₇ | 1,3-diisopropylthio urea. |
| 7 | n-C₄H₉ | H | H | H | 1-n-butylthiourea. |
| 8 | n-C₄H₉ | H | H | n-C₄H₉ | 1,3-di-n-butylthiourea. |
| 9 | n-C₈H₁₇ | H | H | H | 1-n-octylthiourea. |
| 10 | CH₂=CHCH₂ | H | H | H | 1-allylthiourea. |
| 11 | CH₃C(=O)— | H | H | H | 1-acetylthiourea. |
| 12 | CH₃ | CH₃ | H | H | 1,1-dimethylthiourea. |
| 13 | C₆H₁₁ | H | H | —CH₂CH₂NC₄H₈O | 1-cyclohexyl-3-(2'-N-morpholinoethyl) thiourea. |
| 14 | —CH₂CH₂OCH₂CH— | H | H | H | 1-N-morpholino thiourea. |
| 15 | C₆H₅ | H | H | H | 1-phenylthiourea. |
| 16 | C₆H₅ | CH₃ | H | H | 1-phenyl-1-methyl thiourea. |
| 17 | C₆H₅ | H | H | CH₂CH₂OH | 1-phenyl-3-hydroxyethylthiourea. |
| 18 | C₆H₅ | H | H | (CH₂CH₂OH)₂ | 1-phenyl-3-dihydroxyethylthiourea. |
| 19 | C₆H₅ | H | H | CH₂=CHCH₂ | 1-phenyl-3-allylthiourea. |
| 20 | C₆H₅ | H | H | CH₃C(=O)—H / H | 1-phenyl-3-(acetaldehyde)thiourea. |
| 21 | C₆H₅ | H | H | (CH₂)₃N(CH₃)₂ | 1-phenyl-3-(dimethylaminopropyl) thiourea. |
| 22 | C₆H₅ | H | —CH₂CH₂OCH₂CH₂— | | 1-phenyl-3-morpholinyl thiourea. |
| 23 | C₆H₅ | H | H | —CH₂-(4-pyridyl) | 1-phenyl-3-(4'-pyridylmethyl) thiourea. |
| 24 | C₆H₅ | H | H | (3-pyridyl) | 1-phenyl-3-(3'-pyridyl) thiourea. |

TABLE III—Continued

| B | R₁ | R₂ | R₃ | R₄ | Name |
|---|---|---|---|---|---|
| 25 | C₆H₅ | | H | H | -CH₂CH₂-(2-pyridyl) | 1-phenyl-3-(2′-pyridylethyl) thiourea. |
| 26 | C₆H₅ | | H | H | -CH₂-(2-furyl) | 1-phenyl-3-(2′-furfuryl) thiourea. |
| 27 (o) | C₆H₅ | | H | H | o-hydroxyphenyl | 1-(o-hydroxyphenyl)-3-phenylthiourea. |
| 27 (p) | C₆H₅ | | H | H | -C₆H₄-OH | 1-(p-hydroxyphenyl)-3-phenylthiourea. |
| 28 | C₆H₅ | | H | H | SO₃H | 1-(p-sulfophenyl) 3-phenylthiourea. |
| 29 | C₆H₅CH₂ | | H | H | H | 1-benzylthiourea. |
| 30 | 2-thiazolyl | | H | H | C₆H₅ | 1-(2′-thiazolyl)-3-phenylthiourea. |
| 31 | 2-thiazolinyl | | H | H | C₆H₅ | 1-(2′-thizaolinyl)-3-phenylthiourea. |
| 32 | NH₂ | | H | H | H | 3-thiosemicarbazide. |
| 33 | NH₂ | | H | H | C₆H₅ | 4-ethyl-3-thiosemicarbazide. |
| 34 | NH₂ | | H | H | CH₂=CHCH₂ | 4-allyl-3-thiosemicarbazide. |
| 35 | NH₂ | | H | H | C₆H₅ | 4-phenyl-3-thiosemicarbazide. |
| 36 | HCNH (C=O) | | H | H | H | 1-formyl-3-thiosemicarbazide. |
| 37 | C₆H₅NH | | H | H | H | 1-phenyl-3-thiosemicarbazide. |
| 38 | (CH₃)₂C=N | | H | H | H | 1-acetone-3-thiosemicarbazide. |
| 39 | CH₃CONHC₆H₄CH=N | | H | H | H | 1-(4′-formylacetanilide)-3-thiosemicarbazone. |
| 40 | N-methylisatin group | | H | H | H | 1-(N-methylisatin)-3-thiosemicarbazone. |
| 41 | pyridyl-CH=N | | H | H | C₆H₅ | 1-pyridinealdehyde-4-phenyl-3-thiosemicarbazone. |
| 42 | NH₂ | | H | H | NH₂ | Thiocarbohydrazide. |
| 43 | C₆H₅CH=N | | H | H | NH₂ | Monobenzal-thiocarbohydrazone. |

The open-thiourea cooperating additives of Table III may be obtained commercially or may be prepared as indicated herein. For example, N-substituted thioureas may be obtained by the reaction of amines (ammonia, primary, or secondary amines) with substituted isothiocyanates:

1.

$$R^*N=C=S + HN(R^*)_2 \rightarrow R^*NHC(=S)N(R^*)_2$$

wherein R* is R₁₋₄ as previously defined.

Symmetrically substituted thioureas may be obtained by thermal decomposition of the amine salts of thiocarbamic acids:

(2) 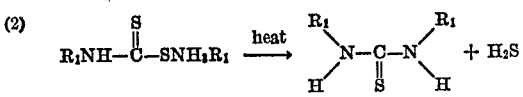

wherein each R₁ is as previously defined herein.

Other methods of preparing either symmetrical or asymmetrical open-thioureas which may be used as cooperating additives according to the invention include the following:

(3) Reaction of substituted cyanamides with hydrogen sulfide:

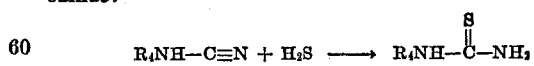

(4) Thermal rearrangement of substituted ammonium thiocyanate:

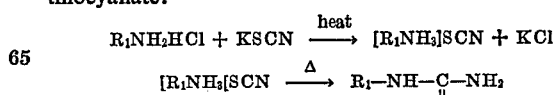

(5) Reaction of amines with thiophosgenes:

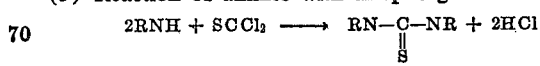

(6) Reaction of thiocarbamylchloride with amines:

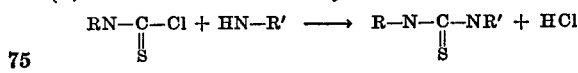

In reactions 5 and 6, each of R and R' represent $R_{1-4}$ as previously defined.

Polyethers which may be used according to the process of the invention may have at least 5 ether oxygen atoms and include polyethers of the formulae:

$$R'''-O-Z$$
$$R'''-S-Z$$
$$\begin{array}{c}R'''\\ \phantom{R'''}\diagdown\\ \phantom{R'''}N-Z\\ \phantom{R'''}\diagup\\ R'''\end{array}$$
$$R'''-N\begin{array}{c}\diagup Z\\ \diagdown Z\end{array}$$

$$R''''(OZ)_m$$
$$R''''(SZ)_m$$
$$R''''\left(\begin{array}{c}R'''\\ |\\ NZ\end{array}\right)_m$$
$$R''''\left(N\begin{array}{c}\diagup Z\\ \diagdown Z\end{array}\right)_m$$

where R'''' is a monovalent radical such as H, alkyl, alkenyl, alkynyl, alkylaryl, arylalkyl or a heterocyclic radical; and R'''' is a m-valent aliphatic, aromatic or heterocyclic radical; $m=2$ to 100; and $$Z=(C_uH_{2u}O)_r(C_vH_{2v}O)_sT$$

where $u$ and $v=0$ to 4, but at least one of $u$ or $v$ must be greater than zero; $r+s=6$ to 1000; $r=0$ when $u=0$; $s=0$ when $v=0$; and $T=H$, alkyl, benzyl, $-SO_3M$, $-C_uH_{2u}SO_3M$, $-PO_3H_2$, or $C_uH_{2u}NHR'''$.

Suitable polyethers which may be used according to the invention include polyethers set forth in Table IV. The polyether additives may be employed in effective amounts, typically 0.005–10.0 g./l. and preferably 0.1–1.0 g./l. of total aqueous bath compositions.

TABLE IV—COOPERATING POLYETHERS

| Additive | | |
|---|---|---|
| C-1 | 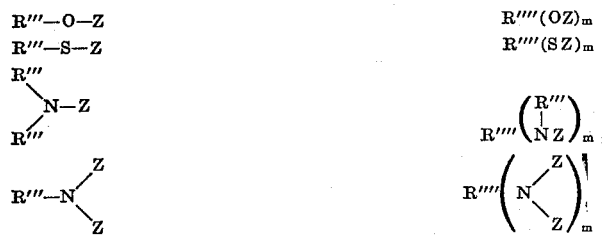 $m+n=30$ | (3) |
| C-2 | Formula C-1 wherein $m+n=15$. | |
| C-3 | Formula C-1 wherein $m+n=10$. | |
| C-4 | $CH_3-\underset{\underset{CH_3}{|}}{\overset{\overset{CH_3}{|}}{C}}-CH_2-\underset{\underset{CH_3}{|}}{\overset{\overset{CH_3}{|}}{C}}-\!\!\bigcirc\!\!-O-(CH_2CH_2O)_xH$ $\quad x=9-10$ | (4) |
| C-5 | Formula C-4 wherein $x=30$. | |
| C-6 | Formula C-4 wherein $x=40$. | |
| C-7 | $C_9H_{19}-\!\!\bigcirc\!\!-O(CH_2CH_2O)_{30}H$ | |
| C-8 | $n\text{-}C_{12}H_{25}O(CH_2CH_2O)_{25}H$ | |
| C-9 | $\begin{array}{c}H\\ |\\ n\text{-}C_xH_{2x+1}C-CH_3\\ |\\ N-(CH_2CH_2O)_yH\\ |\\ (CH_2CH_2O)_zH\end{array}$ $x=9-12; \; y+z=15$ | |
| C-10 | $H(C_2H_4O)_y(C_3H_6O)_x \diagdown \phantom{NCH_2CH_2N} \diagup (C_3H_6O)_x(C_2H_4O)_yH$ $\phantom{H(C_2H_4O)_y(C_3H_6O)_x}NCH_2CH_2N$ $H(C_2H_4O)_y(C_3H_6O)_x \diagup \phantom{NCH_2CH_2N} \diagdown (C_3H_6O)_x(C_2H_4O)_yH$ wherein $x$ is about 3 and $y$ is about 3–4 | |
| C-11 | $HO(C_2H_4O)_xH$; wherein $x$ is about 13 | |
| C-12 | $HO(C_2H_4O)_xH$; wherein $x$ is about 33 | |
| C-13 | $HO(C_3H_6O)_xH$; wherein $x$ is about 6–7 | |
| C-14 | $HO(C_3H_6O)_xH$; wherein $x$ is about 12 | |
| C-15 | $CH_3CH_2\underset{\underset{}{}}{\overset{\overset{CH_3}{|}}{C}}-CH_2-CH_2-\underset{}{\overset{\overset{CH_3}{|}}{C}}-CH_2CH_3$ with $\left[\begin{array}{c}O\\ |\\ CH_2\\ |\\ CH_2\\ |\\ O\end{array}\right]_m \left[\begin{array}{c}CHCH_3\\ |\\ CH_2\\ |\\ O\end{array}\right]_n H$ branches wherein $m=$ about 12–15; $n=$ about 1–2 | |

TABLE IV—Continued

| Additive | |
|---|---|
| C-16 | $CH_3CH_2\underset{\underset{[OCHCH_3\text{-}CH_2\text{-}O]_n}{|}}{\overset{\overset{CH_3}{|}}{C}}-CH_2CH_2-\underset{\underset{[OCHCH_3\text{-}CH_2\text{-}O]_n}{|}}{\overset{\overset{CH_3}{|}}{C}}-CH_2CH_3$ with $[CH_2CH_2O]_m H$ branches; $m$=about 12–15; $n$=1–2 |
| C-17 | $C_{12}H_{25}S(CH_2CH_2O)_{20}H$ |
| C-18 | $H_2N-\underset{\underset{CH_3}{|}}{\overset{\overset{H}{|}}{C}}-CH_2-\left(OCH_2\underset{\underset{CH_3}{|}}{\overset{\overset{H}{|}}{C}}\right)_p-NH_2$ wherein $p$ is about 5–6 |
| C-19 | $H_2N-\underset{\underset{CH_3}{|}}{\overset{\overset{H}{|}}{C}}-CH_2-\left(OCH_2\underset{\underset{CH_3}{|}}{\overset{\overset{H}{|}}{C}}\right)_p-NH_2$ wherein $p$ is about 16 |
| C-20 | $CH_3(CH_2)_5\underset{\underset{O(C_3H_6O)_2(C_2H_4O)_{20}H}{|}}{CHCH_3}$ |
| C-21 | $CH_3(CH_2)_7O(C_2H_4O)_{20}(C_3H_6O)_3H$ |
| C-22 | $CH_3(CH_2)_{11}O(C_2H_4O)_{15}(C_3H_6O)_3H$ |
| C-23 | $H(OH_4C_2)_{15}O(CH_2)_{10}O(C_2H_4O)_{15}H$ |
| C-24 | $\underset{H(OH_4C_2)_8}{\overset{H(OC_2H_4)_8}{\text{N}}}CH_2\underset{CH_3}{\overset{CH_3}{C}}-CH_2-\underset{}{\overset{CH_3}{C}H}-CH_2-CH_2\underset{(C_2H_4O)_8H}{\overset{(C_2H_4O)_8H}{N}}$ |

The chloride ion content of the aqueous copper plating bath compositions of the invention may be at least about 0.5 mg./l. and typically from 1.0 mg./l. to 500 mg./l. of aqueous copper plating bath. Good results may be obtained using a chloride ion concentration of from about 3 mg./l. to 100 mg./l. of aqueous copper plating bath composition, and preferably a chloride ion concentration of from 20 mg./l. to 80 mg./l. of aqueous copper plating solution.

Other optional additives used were the following dispersing agents:

TABLE V

| Additive | |
|---|---|
| D-1 | $\left(CH_2-\text{naphthyl-}SO_3Na\right)_2$ |
| D-2 | $NaO_3S\text{-naphthyl-}CH(H)\text{-naphthyl}(SO_3Na)\text{-}CH(H)\text{-naphthyl-}SO_3Na$ |
| D-3 | $\left[\text{naphthyl}(SO_3Na)\text{-}CH_2\text{-naphthyl-}SO_3Na\right]_n$ where $n$=3 to 6 |
| D-4 | phenyl$(SO_3Na)_n$–phenyl$(C_4H_9)(SO_3Na)_m$; $n+m$=1–2 and preferably $n$=0 when $m$=1 |
| D-5 | $C_nH_{2n+1}$-phenyl$(SO_3M_1)$-O-phenyl$(C_nH_{2n+1})(SO_3M_2)$ | wherein each $n$ is an integer 4–12 (preferably 4–8) and each of $M_1$ and $M_2$ is an alkali metal (preferably Na or K) or a hydrogen atom.

The following examples are set forth for the purpose of providing those skilled-in-the-art with a better understanding of this invention, and the invention is not to be construed as limited to such examples.

In these examples the aqueous copper plating bath contains unless noted otherwise:

|  | G./l. |
|---|---|
| $CuSO_4 \cdot 5H_2O$ | 220 |
| $H_2SO_4$ | 60 |
| Chloride ion | 0.06 |

The plating experiments were performed in a Hull Cell containing 250 ml. of this acid copper sulfate bath. The Hull Cell allows one to observe the appearance of the deposit over a wide current density range. In order to judge the degree of leveling the polished brass panels used for these plating tests were scratched with 4/0 emery polishing paper over a horizontal band of about 10 mm. width. The plating temperature used in these experiments was the ambient room temperature (24–30° C.), unless otherwise stated. The total current was 2 amperes and the plating time 10 minutes. Air agitation or mechanical agitation with an oscillating paddle was used as specified in Table VI. The sulfonated polysulfide compounds used are described in Table II, the open-thiourea compounds in Table III, and the polyethers in Table IV.

For convenience, the results shown in Table VI are classified according to (1) the width of the lustrous current density range (semi-bright to bright) and according to (2) the degree of leveling under the indicated experimental conditions (i.e. a 250 ml. Hull Cell, 2 amperes current, and a ten minute plating time on a metal strip having a band uniformly scratched with 4/0 grit emery paper).

The combination of the panel ratings given with respect to width of lustrous current density range and degree of leveling determine the final classification set forth in the "Results" column of Table VI according to the following:

| Results: | Definition |
|---|---|
| Excellent | Very good leveling and very good bright current density range. |
| Very good | Very good leveling and good bright current density range. |
| Good | Good to very good leveling and good to very good semi-bright current density range or: good leveling and good to very good bright current density range. |
| Poor | Poor leveling and/or poor lustrous current density range. |
| Fair | All intermediate panels not otherwise classified. |

TABLE VI

| Example No. | Additive | Amounts, g./l. | Type of agitation | Results |
|---|---|---|---|---|
| 1 | A-1<br>C-10 | 0.03<br>1.00 | Air | Poor (control). |
| 2 | A-1<br>C-10<br>B-1 | 0.03<br>1.00<br>0.0004 | Air | Very good. |
| 3 | A-1<br>C-10<br>B-36 | 0.03<br>1.00<br>0.001 | Air | Good. |
| 4 | A-1<br>C-18 | 0.03<br>0.2 | Air | Poor (control). |
| 5 | A-1<br>C-18<br>B-3 | 0.03<br>0.2<br>0.002 | Air | Fair. |
| 6 | A-1<br>C-18<br>D-1 | 0.03<br>0.2<br>0.4 | Air | Poor (control). |
| 7 | A-1<br>C-18<br>D-1<br>B-3 | 0.03<br>0.2<br>0.4<br>0.002 | Air | Good. |
| 8 | A-2<br>C-6 | 0.018<br>0.25 | Mechanical | Poor (control). |
| 9 | A-2<br>C-6<br>B-2 | 0.018<br>0.25<br>0.001 | do | Good. |
| 10 | A-2<br>C-6<br>B-23 | 0.018<br>0.25<br>0.004 | do | Very good. |
| 11 | A-2<br>C-6<br>B-25 | 0.018<br>0.25<br>0.004 | do | Good. |
| 12 | A-2<br>C-12 | 1.0<br>0.02 | Air | Poor (control). |
| 13 | A-2<br>C-12<br>B-16 | 1.0<br>0.02<br>0.004 | Air | Very good. |
| 14 | A-6<br>C-12 | 0.02<br>1.0 | Air | Poor (control). |
| 15 | A-6<br>C-12<br>D-1 | 0.02<br>1.0<br>0.04 | Air | Do. |
| 16 | A-6<br>C-12<br>B-4 | 0.02<br>1.0<br>0.001 | Air | Excellent. |
| 17 | A-6<br>C-12<br>B-11 | 0.02<br>1.0<br>0.003 | Air | Fair. |
| 18 | A-6<br>C-12<br>B-16 | 0.02<br>1.0<br>0.004 | Air | Excellent. |
| 19 | A-6<br>C-12<br>B-28 | 0.02<br>1.0<br>0.002 | Air | Fair. |
| 20 | A-6<br>C-12<br>B-32 | 0.02<br>1.0<br>0.001 | Air | Fair (partly cloudy). |
| 21 | A-6<br>C-12<br>B-32<br>D-1 | 0.02<br>1.0<br>0.001<br>0.4 | Air | Fair (fully bright). |
| 22 | A-6<br>C-12<br>B-40 | 0.02<br>1.0<br>0.007 | Air | Good (grainy bright). |
| 23 | A-6<br>C-12<br>B-40<br>D-1 | 0.02<br>1.0<br>0.007<br>0.4 | Air | Good (fully bright). |
| 24 | A-9<br>C-1 | 0.016<br>1.00 | Air | Poor (control). |
| 25 | A-9<br>C-1<br>D-1 | 0.016<br>1.0<br>0.4 | Air | Poor (control). |
| 26 | A-9<br>C-1<br>B-4 | 0.016<br>1.0<br>0.002 | Air | Very good (cloudy bright). |
| 27 | A-9<br>C-1<br>B-4<br>D-1 | 0.016<br>1.0<br>0.002<br>0.4 | Air | Very good (fully bright). |
| 28 | A-9<br>C-1<br>B-5 | 0.016<br>1.00<br>0.001 | Air | Excellent. |
| 29 | A-9<br>C-1<br>B-8 | 0.016<br>1.00<br>0.001 | Air | Very good. |

NOTE.—Table continued on next page.

| Property (1) | | Property (2) | |
|---|---|---|---|
| Rating | Width of lustrous current density range | Rating | Degree of leveling |
| Poor | Less than one half of length of test panel | Poor | No visual change in original roughness of scratched band. |
| Fair | More than one half and less than two thirds of length of test panel | Fair | Noticeable decrease in roughness, but scratches still visible. |
| Good | More than two thirds but less than entire length of test panel | Good | Roughness decreased and portions of scratches completely level. |
| Very good | Entire length of test panel is lustrous | Very good | Scratches on the portion of the panel having a current density greater than 2.5 a.s.d. are practically invisible. |

NOTE—Each property in groups (1) and (2) is independently measured as "poor," "fair," "good," and "very good."

TABLE VI—Continued

| Example No. | Additive | Amounts, g./l. | Type of agitation | Results |
|---|---|---|---|---|
| 30 | A-9, C-1, B-16 | 0.016, 1.00, 0.002 | Air | Do. |
| 31 | A-9, C-1, B-20 | 0.016, 1.0, 0.006 | Air | Fair. |
| 32 | A-9, C-1, 5-27(p) | 0.016, 1.0, 0.006 | Air | Very good. |
| 33 | A-9, C-1, B-35 | 0.016, 1.00, 0.003 | Air | Do. |
| 34 | A-9, C-1, B-39 | 0.016, 1.0, 0.002 | Air | Do. |
| 35 | A-9, C-1, B-41 | 0.016, 1.0, 0.003 | Air | Very good (cloudy bright). |
| 36 | A-9, C-1, B-41, D-1 | 0.016, 1.0, 0.003, 0.4 | Air | Very good (fully bright). |
| 37 | A-9, C-6 | 0.016, 0.25 | Mechanical | Poor (control). |
| 38 | A-9, C-6, B-2 | 0.016, 0.25, 0.001 | do | Very good. |
| 39 | A-9, C-7 | 0.016, 0.25 | do | Poor (control). |
| 40 | A-9, C-7, B-2 | 0.016, 0.25, 0.001 | do | Very good. |
| 41 | A-9, C-8 | 0.016, 0.25 | do | Poor (control). |
| 42 | A-9, C-8, B-2 | 0.016, 0.25, 0.001 | do | Good. |
| 43 | A-9, C-13 | 0.016, 0.2 | Air | Poor (control). |
| 44 | A-9, C-13, B-5 | 0.016, 0.2, 0.001 | Air | Very good. |
| 45 | A-9, C-13, B-38 | 0.016, 0.2, 0.001 | Air | Good. |
| 46 | A-9, C-14 | 0.016, 0.1 | Air | Poor (control). |
| 47 | A-9, C-14, B-3 | 0.016, 0.1, 0.001 | Air | Good. |
| 48 | A-9, C-15 | 0.016, 1.0 | Air | Poor (control). |
| 49 | A-9, C-15, B-4 | 0.016, 1.0, 0.001 | Air | Excellent. |
| 50 | A-9, C-15, B-19 | 0.016, 1.0, 0.004 | Air | Fair. |
| 51 | A-9, C-15, B-25 | 0.016, 1.0, 0.002 | Air | Good. |
| 52 | A-9, C-19 | 0.016, 0.1 | Air | Poor (control). |
| 53 | A-9, C-19, B-3 | 0.016, 0.1, 0.001 | Air | Good. |
| 54 | A-9, C-22 | 0.008, 1.0 | Air | Poor (control). |
| 55 | A-9, C-22, B-11 | 0.008, 1.0, 0.002 | Air | Good. |
| 56 | A-9, C-22, B-22 | 0.008, 1.0, 0.002 | Air | Do. |
| 57 | A-9, C-22 | 0.016, 1.0 | Air | Poor (control). |
| 58 | A-9, C-22, B-24 | 0.016, 1.0, 0.004 | Air | Good. |
| 59 | A-11, C-12 | 0.02, 1.0 | Air | Poor (control). |
| 60 | A-11, C-12, B-16 | 0.02, 1.0, 0.004 | Air | Good. |
| 61 | A-11, C-21 | 0.01, 3.0 | Air | Poor (control). |
| 62 | A-11, C-21, B-7 | 0.01, 3.0, 0.001 | Air | Fair. |
| 63 | A-11, C-21, B-7, D-1 | 0.01, 3.0, 0.001, 0.4 | Air | Very good. |
| 64 | A-12, C-12 | 0.02, 1.0 | Air | Poor (control). |
| 65 | A-12, C-12, B-16 | 0.02, 1.0, 0.004 | Air | Very good. |
| 66 | A-12, C-21 | 0.01, 3.0 | Air | Poor (control). |
| 67 | A-12, C-21, B-7 | 0.01, 3.0, 0.001 | Air | Fair. |
| 68 | A-12, C-21, B-7, D-1 | 0.01, 3.0, 0.001, 0.4 | Air | Excellent. |
| 69 | A-15, C-12 | 0.01, 0.5 | Air | Poor (control). |
| 70 | A-15, C-12, B-2 | 0.01, 0.5, 0.001 | Air | Excellent. |
| 71 | A-15, C-12, B-15 | 0.01, 0.5, 0.02 | Air | Very good. |
| 72 | A-15, C-12, B-17 | 0.01, 0.5, 0.02 | Air | Good. |
| 73 | A-15, C-12, B-18 | 0.01, 0.5, 0.003 | Air | Do. |
| 74 | A-15, C-13 | 0.02, 1.0 | Air | Poor (control). |
| 75 | A-15, C-13, B-33 | 0.02, 1.0, 0.002 | Air | Good. |
| 76 | A-15, C-13, B-34 | 0.02, 1.0, 0.002 | Air | Fair. |
| 77 | A-15, C-13, B-43 | 0.02, 1.0, 0.002 | Air | Good. |
| 78 | A-15, C-15 | 0.01, 1.0 | Air | Fair (control). |
| 79 | A-15, C-15, B-35 | 0.01, 1.0, 0.001 | Air | Good. |
| 80 | A-15, C-15, B-37 | 0.01, 1.0, 0.001 | Air | Excellent. |
| 81 | A-15, C-15 | 0.02, 1.0 | Air | Poor (control). |
| 82 | A-15, C-15, B-1 | 0.02, 1.0, 0.0005 | Air | Good. |
| 83 | A-15, C-15, B-1 | 0.02, 1.0, 0.001 | Air | Good to very good.[1] |
| 84 | A-15, C-15, B-2 | 0.02, 1.0, 0.001 | Air | Excellent. |
| 85 | A-15, C-15, B-4 | 0.02, 1.0, 0.001 | Air | Do. |
| 86 | A-15, C-15, B-7 | 0.02, 1.0, 0.001 | Air | Do. |
| 87 | A-15, C-15, B-10 | 0.02, 1.0, 0.001 | Air | Fair. |
| 88 | A-15, C-15, B-11 | 0.02, 1.0, 1.0 | Air | Do. |
| 89 | A-15, C-15, B-12 | 0.02, 1.0, 0.001 | Air | Good. |
| 90 | A-15, C-15, B-27 (o) | 0.02, 1.0, 0.006 | Air | Very good. |
| 91 | A-15, C-15, B-30 | 0.02, 1.0, 0.002 | Air | Good. |
| 92 | A-16, C-12 | 0.005, 0.5 | Air | Poor (control). |
| 93 | A-16, C-12, B-5 | 0.005, 0.5, 0.001 | Air | Good. |
| 94 | A-16, C-15 | 0.02, 1.0 | Air | Poor (control). |
| 95 | A-16, C-15, B-4 | 0.02, 1.0, 0.001 | Air | Very good. |
| 96 | A-16, C-19 | 0.02, 0.1 | Air | Poor (control). |
| 97 | A-16, C-19, D-1 | 0.02, 0.1, 0.4 | Air | Do. |
| 98 | A-16, C-19, B-3 | 0.02, 0.1, 0.001 | Air | Fair. |
| 99 | A-16, C-19, B-3, D-1 | 0.20, 0.1, 0.001, 0.4 | Air | Good. |
| 100 | A-17, C-14 | 0.02, 1.0 | Air | Poor (control). |
| 101 | A-17, C-14, D-1 | 0.02, 1.0, 0.4 | Air | Do. |
| 102 | A-17, C-14, B-3 | 0.20, 1.0, 0.002 | Air | Good. |
| 103 | A-17, C-14, B-23, D-1 | 0.02, 1.0, 0.004, 0.4 | Air | Fair. |
| 104 | A-17, C-14, B-24, D-1 | 0.02, 0.5, 0.008, 0.4 | Air | Good. |

See footnote at end of table.

TABLE VI—Continued

| Example No. | Additive | Amounts, g./l. | Type of agitation | Results |
|---|---|---|---|---|
| 105 | A-17<br>C-21 | 0.01<br>3.0 | Air | Poor (control). |
| 106 | A-17<br>C-21<br>D-1 | 0.01<br>3.0<br>0.4 | Air | Do. |
| 107 | A-17<br>C-21<br>B-7 | 0.01<br>3.0<br>0.001 | Air | Good. |
| 108 | A-17<br>C-21<br>B-7<br>D-1 | 0.01<br>3.0<br>0.001<br>0.4 | Air | Very good. |
| 109 | A-18<br>C-13 | 0.015<br>1.0 | Air | Poor (control). |
| 110 | A-18<br>C-13<br>B-6 | 0.015<br>1.0<br>0.002 | Air | Good. |
| 111 | A-18<br>C-13<br>B-13 | 0.015<br>1.0<br>0.002 | Air | Do. |
| 112 | A-18<br>C-13<br>B-22 | 0.015<br>1.0<br>0.004 | Air | Fair. |
| 113 | A-18<br>C-13<br>B-26 | 0.015<br>1.0<br>0.008 | Air | Good. |
| 114 | A-18<br>C-15 | 0.018<br>1.0 | Air | Poor (control). |
| 115 | A-18<br>C-15<br>B-4 | 0.018<br>1.0<br>0.001 | Air | Very good. |
| 116 | A-18<br>C-21 | 0.01<br>3.0 | Air | Poor (control). |
| 117 | A-18<br>C-21<br>B-7 | 0.01<br>3.0<br>0.001 | Air | Very good (but pitted). |
| 118 | A-18<br>C-21<br>B-7<br>D-1 | 0.01<br>3.0<br>0.001<br>0.4 | Air | Very good (not pitted). |
| 119 | A-19<br>C-15 | 0.02<br>1.0 | Air | Poor (control). |
| 120 | A-19<br>C-15<br>B-27(o) | 0.02<br>1.0<br>0.005 | Air | Good. |
| 121 | A-19<br>C-19 | 0.03<br>0.1 | Air | Poor (control). |
| 122 | A-19<br>C-19<br>B-1 | 0.03<br>0.1<br>0.001 | Air | Good. |

[1] Leveling is very good above about 1.5 amps./dm.², but completely absent below 1.5 amps./dm.². At this current density striations and haziness appears and the deposit appearance changes suddenly.

The following is a brief discussion and analysis of the foregoing examples.

(1) Substituents

As can be seen from the results of Table VI, the use of 0.0005 g./l. (e.g. Example 82) of thiourea additive (B–1) does not produce optimum leveling and bright current density range, whereas 0.001 g./l. (Example 83) gives very good leveling above about 1.5 amps./dm.², but striations and haziness at about this current density and an abrupt decrease of deposit thickness and leveling extending over the low current density area. Introduction of one alkyl group improves the performance (B–2 and especially B–4 and B–7, e.g. in Examples 16, 26, 27, 38, 40, 49, 63, 68, 70, 108, 115, 117, 118). Introduction of one alkyl group on each of the two nitrogen atoms also gives good to excellent results, B–5, Examples 28, 44, 93) giving better results than B–3 (Examples 7, 47, 53, 99, 102).

The 1,1-dimethylthiourea (B–12, Example 89) performs about as well as the 1,3-dimethylthiourea (B–3).

On the other hand introduction of an acetyl group (B–11) and especially of an allyl group (B–10) somewhat reduces the leveling effect of the thioureas (Examples 17, 55, 87, 88). Note that 1-phenylthiourea (B–15) gives very good results (e.g. Example 71) and 1-phenyl-1-methylthiourea (B–16 in Examples 18, 30, 65) even better results. Introduction of a phenol group (B–27) or a 4-pyridylmethyl group (B–23) on the 3-nitrogen atom of 1-phenylthiourea also gives very good results (Examples 10, 32, 90), whereas introduction of an allyl group (B–19, Example 50) is rather harmful.

Substitution of a NH₂⁻ group for one of the hydrogen atoms of thiourea, giving 3-thiosemicarbazide (B–32) is definitely harmful (e.g. Examples 20, 21). This harmful effect is partly or totally overcome if this NH₂⁻ group is replaced by

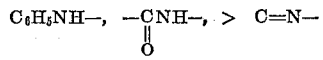

or C₂H₅NH— groups (B–33, B–35, B–36, B–37, B–38, B–39, B–40, B–41, B–42 in Examples 3, 22, 23, 33, 34, 35, 36, 45, 75, 79, 80), but not by an allylamino (CH₂=CHCH₂NH—) group (B–34 in Example 76).

(2) Dispersing agents

Addition of a dispersing agent such as D–1 to the A+B+C combination often improves the rating (compare Example 7 and Example 6; Example 99 and Example 98; Example 104 and Example 103; Example 108 and Example 107; and, especially, Examples 63 and Example 62; and Example 68 and Example 67) by increasing the rate of leveling and/or the lustrous current density range.

For other cases, addition of D–1 does not appreciably change the ratings (e.g. Example 23 and Example 22; Example 27 and Example 26; Example 36 and Example 35; and Example 118 and Example 117) but increases the degree of brightness or eliminates microroughness.

(3) Cooperation with other types of levelers and low current density brightness

Addition of other levelers and low current density brighteners besides that of the A-, B-, and C-compounds of this invention may often give further improvement of results.

For instance, Example 51 gave only "good" results, but if, besides the same concentrations of A–9 and C–15, instead of 0.002 g./l. of B–25 either 0.001 g./l. of B–25 plus 0.001 g.l. of 2-thiazolidinethione (2-mercaptothiazoline) or 0.002 g./l. of B–25 plus 0.001 g.l. of 2-thiazolidinethione are added to the copper bath, the results are "excellent." If no B–25 were used, but only 0.001 g./l. of 2-thiazolidinethione (together with A–9 and C–15) leveling would be below the optimum, while with 0.002 g.l. of 2-thiazolidinethione, leveling would be very good above about 1.3 amp./dm.², but the decrease of deposit thickness and leveling at and below this current density would be very abrupt. Simultaneous use of the open thiourea B–25 (and of many other B-compounds) with the heterocyclic leveler 2-thiazolidinethione (and with many other levelers and low-current-density-brighteners) together with A- and C-compounds produces good results within the scope of this invention.

(4) Fluoborate bath

For a fluoborate bath of the preferred composition indicated in Table I, the additives of Example 16 gave "good" results, of Example 86 (with 0.002 g./l. B–7) "very good" results, of Example 80 (with 0.0025 g.l. B–37) "good" results in a 250 ml. Hull Cell (at 2 amperes current and 10 minutes plating time). The ratings under these conditions are less good than in the sulfate bath, and higher concentrations of B-compounds may be required. On the other hand, maximum admissible plating speeds are increased by 50 to 100%.

Although this invention has been illustrated by reference to specific embodiments, modifications thereof which are clearly within the scope of the invention will be apparent to those skilled-in-the-art.

We claim:

1. A process for electrodepositing bright, strongly leveled, ductile copper from an aqueous acidic copper plating bath containing chloride ions and at least one member independently selected from each of the following groups:

(A) 0.001 gram per liter to 1.0 gram per liter of a polysulfide compound of the formula

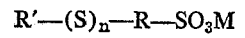

(B) 0.1 milligram per liter to 20 milligrams per liter of an open-thiourea compound of the formula

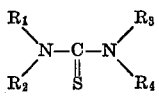

and/or tautomers thereof; and (C) 0.005 gram per liter to 10.0 grams per liter of a polyether, containing at least 5 ether oxygen atoms per molecule;

wherein each R is independently a divalent aliphatic or aromatic non-heterocyclic group of 1–10 carbon atoms and may not be a polyether radical; R' is hydrogen, a metal cation, a monovalent aliphatic or aromatic group of 1–20 carbon atoms, or the groups —R—$SO_3M$ or —R—$(S)_q$—$RSO_3M$ wherein $q$ is an integer 2–5 and may not be a polyether radical; M is a cation; each of $R_1$, $R_2$, $R_3$, and $R_4$ is independently hydrogen or an alkyl, aryl, alkenyl, acetyl, aldehydoalkyl, amino, hetero group having a ring containing 5–7 ring atoms and at least one hetero-atom selected from the group consisting of oxygen, nitrogen, and sulfur; hydroxyalkyl or aminoalkyl group of 1–16 carbon atoms; with at least one $R_{1-4}$ a hydrogen atom; each of $R_{1-2}$ and $R_{3-4}$ may form a ring with each of the nitrogen atoms; and $n$ is an integer 2–5.

2. The process as claimed in claim 1 wherein each of $R_{1-3}$ is a hydrogen atom and $R_4$ is an alkyl group of 1–4 carbon atoms.

3. The process as claimed in claim 1 wherein each of $R_1$ and $R_3$ is a hydrogen atom and each of $R_2$ and $R_4$ is independently selected from the group consisting of a hydrogen atom, an alkyl group of 1–4 carbon atoms, and a phenyl group.

4. The process as claimed in claim 1 wherein the open thiourea compound is 1-pyridinealdehyde-4-phenyl-3-thiosemicarbazone.

5. The process as claimed in claim 1 wherein the open thiourea compound is 1-n-butyl-thiourea.

6. The process as claimed in claim 1 wherein the open thiourea compound is 1-ethylthiourea.

7. The process as claimed in claim 1 wherein the open thiourea compound is 1-phenyl-3-(4'-pyridinylmethyl) thiourea.

8. An aqueous acidic copper plating bath containing chloride ions and at least one member independently selected from each of the following groups:

(A) 0.001 gram per liter to 1.0 gram per liter of a polysulfide compound of the formula $$R'—(S)_n—R—SO_3M$$

(B) 0.1 milligrams per liter to 20 milligrams per liter of an open-thiourea compound of the formula

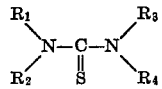

and/or tautomers thereof; and (C) 0.005 gram per liter to 10.0 grams per liter of a polyether, containing at least 5 ether oxygen atoms per molecule;

wherein each R is independently a divalent aliphatic or aromatic non-heterocyclic group of 1–10 carbon atoms and may not be a polyether radical; R' is hydrogen, a metal cation, a monovalent aliphatic or aromatic group of 1–20 carbon atoms, or the groups —R—$SO_3M$ or —R—$(S)_q$—$RSO_3M$ wherein $q$ is an integer 2–5 and may not be a polyether radical; M is a cation; each of $R_1$, $R_2$, $R_3$, and $R_4$ is independently hydrogen or an alkyl, aryl, alkenyl, acetyl, aldehydoalkyl, amino, hetero group having a ring containing 5–7 ring atoms and at least one hetero-atom selected from the group consisting of oxygen, nitrogen, and sulfur; hydroxyalkyl or aminoalkyl group of 1–16 carbon atoms; with at least one $R_{1-4}$ a hydrogen atom; each of $R_{1-2}$ and $R_{3-4}$ may form a ring with each of the nitrogen atoms; and $n$ is an integer 2–5.

9. An aqueous acidic copper plating bath as claimed in claim 8 wherein each of $R_{1-3}$ is a hydrogen atom and $R_4$ is an alkyl group of 1–4 carbon atoms.

10. An aqueous acidic copper plating bath as claimed in claim 8 wherein each of $R_1$ and $R_3$ is a hydrogen atom and each of $R_2$ and $R_4$ is independently selected from the group consisting of a hydrogen atom, an alkyl group of 1–4 carbon atoms, and a phenyl group.

11. An aqueous acidic copper plating bath as claimed in claim 8 wherein the open thiourea compound is 1-pyridinealdehyde-4-phenyl-3-thiosemicarbazone.

12. An aqueous acidic copper plating bath as claimed in claim 8 wherein the open thiourea compound is 1-n-butyl-thiourea.

13. An aqueous acidic copper plating bath as claimed in claim 8 wherein the open thiourea compound is 1-ethylthiourea.

14. An aqueous acidic copper plating bath as claimed in claim 8 wherein the open thiourea compound is 1-phenyl-3-(4'-pyridinylmethyl) thiourea.

References Cited
UNITED STATES PATENTS

| | | | |
|---|---|---|---|
| 3,542,655 | 11/1970 | Kardos et al. | 204—52 R |
| 3,000,800 | 9/1961 | Strauss et al. | 204—52 R |
| 3,267,010 | 8/1966 | Creutz et al. | 204—52 R |
| 3,328,273 | 6/1967 | Creutz et al. | 204—52 R |
| 2,849,352 | 8/1958 | Kirstahler et al. | 204—44 |
| 3,023,152 | 2/1962 | Strauss et al. | 204—52 R |

GERALD L. KAPLAN, Primary Examiner

U.S. Cl. X.R.

260—294.8 H, 302